US 9,838,081 B1

(12) United States Patent
Hallamasek et al.

(10) Patent No.: US 9,838,081 B1
(45) Date of Patent: Dec. 5, 2017

(54) LOW-POWER WIDE-BAND COMMUNICATION LINKS IN HIGH-VOLTAGE TRANSMISSION LINES

(71) Applicant: X Development LLC, Mountain View, CA (US)

(72) Inventors: Kurt Hallamasek, San Carlos, CA (US); Geoff Dolan, Mountain View, CA (US); George Edward Homsy, San Rafael, CA (US); Leo Casey, San Francisco, CA (US); Elias Wolfgang Patten, Seattle, WA (US)

(73) Assignee: X Development LLC, Mountain View, CA (US)

( * ) Notice: Subject to any disclaimer, the term of this patent is extended or adjusted under 35 U.S.C. 154(b) by 559 days.

(21) Appl. No.: 14/320,133

(22) Filed: Jun. 30, 2014

(51) Int. Cl.
*H04B 3/56* (2006.01)

(52) U.S. Cl.
CPC .......... *H04B 3/56* (2013.01); *H04B 2203/54* (2013.01); *H04B 2203/5404* (2013.01); *H04B 2203/5429* (2013.01)

(58) Field of Classification Search
CPC ... H04L 2012/2843; H04L 27/02; H04B 3/56; H04B 3/54; H04B 2203/54; H04B 2203/5408; H04B 2203/5412; H04B 2203/5416; H04B 2203/5429; H04B 2203/5445; H04B 2203/5462; H04B 2203/547

See application file for complete search history.

(56) References Cited

U.S. PATENT DOCUMENTS

| | | | |
|---|---|---|---|
| 6,933,835 B2 | 8/2005 | Kline | |
| 8,674,539 B1 | 3/2014 | Magin et al. | |
| 2005/0232344 A1* | 10/2005 | Mollenkopf | H04B 3/54 375/220 |
| 2009/0122842 A1* | 5/2009 | Vavik | H04B 3/56 375/211 |
| 2010/0013226 A1* | 1/2010 | Blumer | B64B 1/50 290/44 |
| 2012/0070122 A1* | 3/2012 | Lind | F03D 5/00 385/103 |
| 2013/0049918 A1* | 2/2013 | Fu | H01F 3/12 336/220 |
| 2013/0100831 A1* | 4/2013 | Brandt | H04B 3/542 370/252 |
| 2013/0342008 A1* | 12/2013 | Takata | H04B 3/548 307/9.1 |
| 2013/0343404 A1 | 12/2013 | Vijayasankar et al. | |
| 2014/0129892 A1 | 5/2014 | Magin et al. | |

* cited by examiner

*Primary Examiner* — Jared Fureman
*Assistant Examiner* — Joel Barnett
(74) *Attorney, Agent, or Firm* — McDonnel Boehnen Hulbert

(57) ABSTRACT

Embodiments described herein may relate to power-line communication (PLC) systems that are suitable for high-voltage and electrically noisy applications. In one example system, PLC technology is used to carry data on at least one pair of conductors of a high-voltage (e.g., kilovolt) transmission line that is simultaneously used for power transmission. Further, in some instances, the transmission line may be part of a tether that connects an aerial vehicle to a ground station.

19 Claims, 7 Drawing Sheets

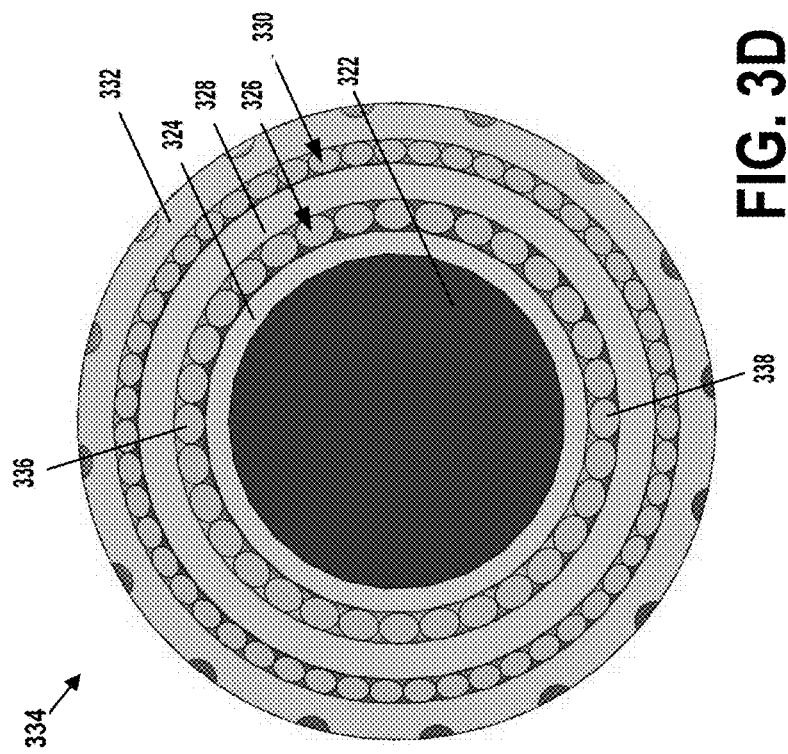
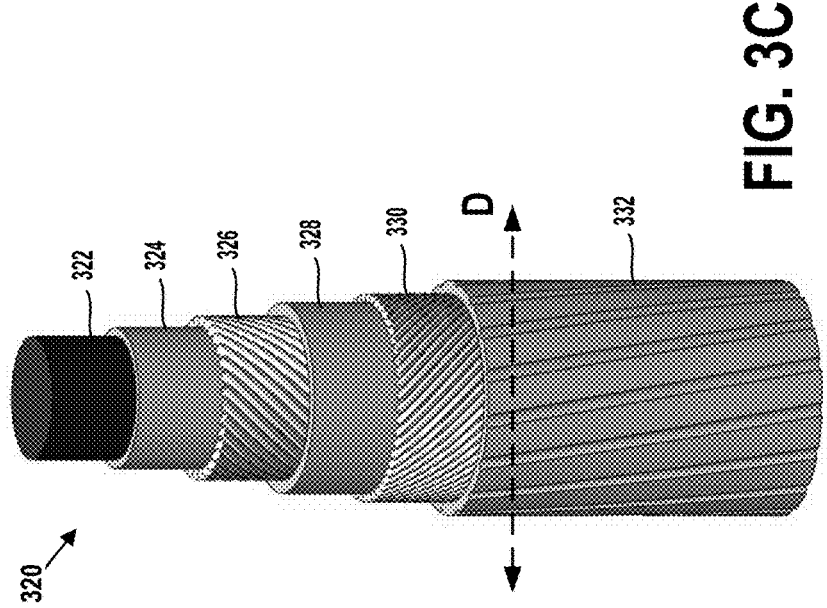

LOW-POWER WIDE-BAND COMMUNICATION LINKS IN HIGH-VOLTAGE TRANSMISSION LINES

BACKGROUND

Unless otherwise indicated herein, the materials described in this section are not prior art to the claims in this application and are not admitted to be prior art by inclusion in this section.

Power-line communication (PLC) systems operate by adding a modulated carrier signal to an existing wiring system that is simultaneously used for electric power transmission or power distribution. By way of example, a PLC system may provide a means for networking electronic devices within a home or office together by communicating data over existing alternating current (AC) wiring between electrical outlets. As another example, a PLC system may provide a means for utility companies to communicate with customer utility meters over existing AC wiring between transformers and customer outlets.

Modern PLC technology can roughly be categorized into two categories: narrowband PLC and broadband PLC. Narrowband PLC is often used for low-bit rate communication (e.g., tens or hundreds of kilobits per second) over distances of several kilometers. Applications of narrowband PLC technology include automatic utility meter reading, and control of building or street lighting, for example. Narrowband PLC systems may occupy frequency bands below 500 kHz.

On the other hand, broadband PLC is often used for transmitting two-way data at higher bit-rates and over short ranges than narrowband PLC. For instance, broadband PLC is designed for communicating data over existing AC electrical distribution wiring (e.g., between transformers used for power distribution or between electrical outlets within a home). Broadband PLC systems may use modulation schemes such as orthogonal frequency division multiplexing (OFDM) or quadrature amplitude modulation (QAM). Broadband PLC systems may occupy frequencies that are part of the radio spectrum allocated to over-the-air communication services (e.g., 2 MHz to 80 MHz). Other types of PLC systems also exist.

SUMMARY

Embodiments described herein may relate to PLC systems that are suitable for high-voltage and electrically noisy applications. In one example system, PLC technology is used to carry data on a high-voltage (e.g., one to several kilovolts) transmission line between an aerial vehicle and a ground station. For instance, the transmission line may be part of a tether that connects the aerial vehicle and the ground station, and data may be communicated on at least one pair of conductors of the transmission line. In contrast to existing low-bandwidth, high-voltage narrowband PLC systems, the described PLC systems enable data rates of tens of megabits per second. And in contrast to existing low-voltage, short-range broadband PLC systems, the described PLC systems enable communication over high-voltage AC or DC power transmission lines at distances of hundreds of meters. Additional embodiments in other types of high-voltage applications are also possible.

In one aspect, a PLC system is provided. The PLC system includes a PLC-transmitter and a PLC-receiver. The PLC-transmitter is coupled to a pair of conductors of a transmission line at a first position of the transmission line. Additionally, the PLC-transmitter is configured to transmit a communication signal on the pair of conductors. The transmission line is configured to carry a voltage greater than one thousand volts over a distance of at least one hundred meters, and conductors of the pair of conductors operate at the substantially same potential. The PLC-receiver is coupled to the pair of conductors at a second position of the transmission line and is configured to receive the communication signal.

In a further aspect, another PLC system is provided. The PLC system includes a PLC-transmitter, a PLC-receiver, a first differential-mode choke, and a second-differential mode choke. The PLC-transmitter is coupled to a pair of conductors of a power transmission line at a first position of the transmission line and configured to transmit a communication signal on the pair of conductors. The conductors of the pair of conductors operate at the substantially same potential. The PLC-receiver is coupled to the pair of conductors at a second position of the transmission line and configured to receive the communication signal. The first differential-mode choke and the second differential-mode choke are also coupled to the pair of conductors. Further, the first differential-mode choke and the second differential-mode choke separate a portion of the transmission line used for PLC from portions of the transmission line not used for PLC.

In another aspect, a system that includes an aerial vehicle and a ground station is provided. The aerial vehicle includes a PLC-transmitter that is coupled to a transmission line and configured to transmit a communication signal on the transmission line. The ground station includes a PLC-receiver that is coupled to the transmission line and configured to receive the communication signal. Further, the transmission line comprises a tether coupling the aerial vehicle to the ground station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3C illustrates a cutaway view of another example tether, in accordance with an embodiment.

FIG. 3D illustrates a cross-sectional view of the portion of the tether of FIG. 3C, shown along line D of FIG. 3C.

DETAILED DESCRIPTION

Figure 1:
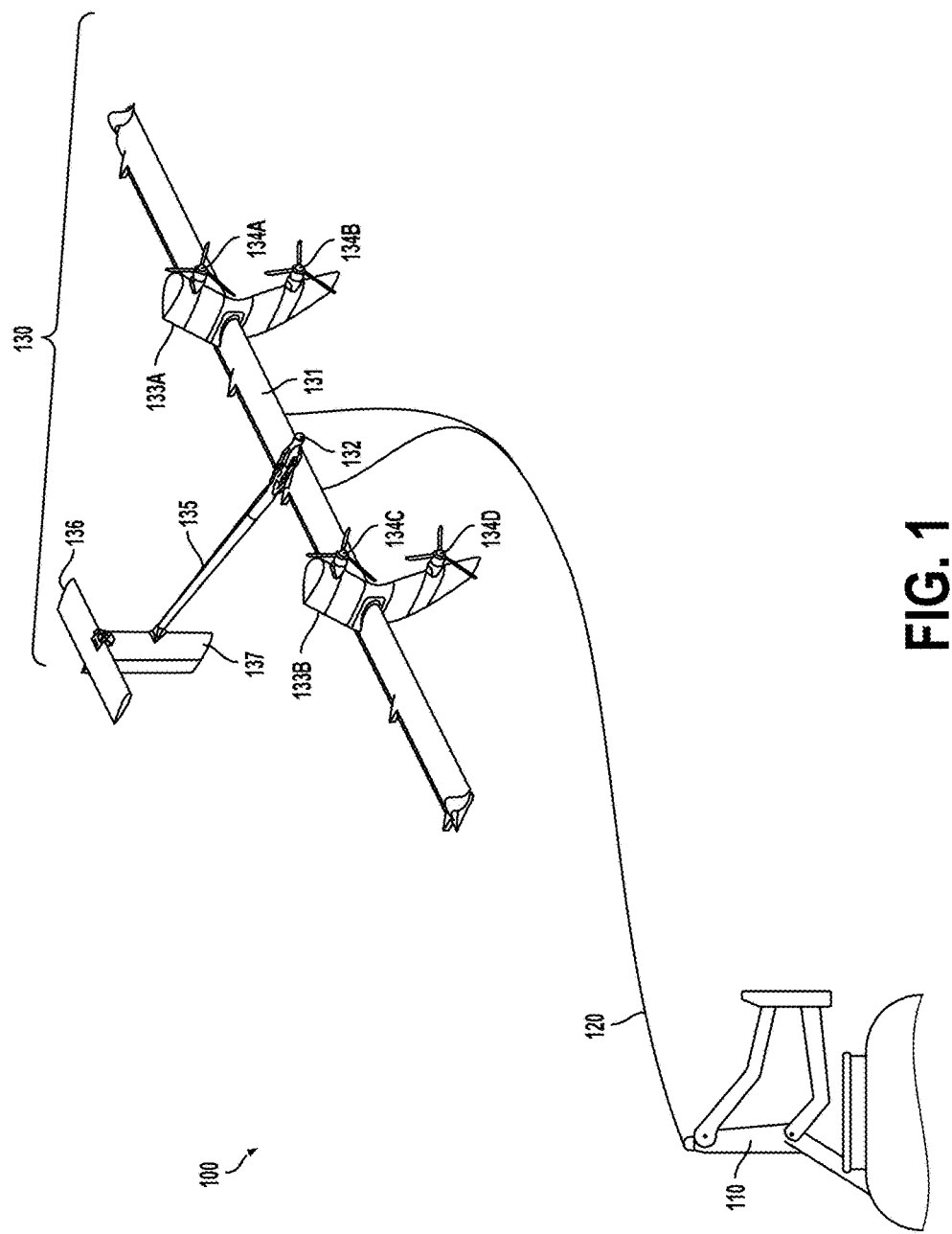
FIG. 1 depicts a tethered flight system, according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. OVERVIEW

Embodiments described herein may relate to PLC systems that are suitable for high-voltage and electrically noisy applications. In an illustrative embodiment, PLC technology is used to carry data on at least one pair of conductors of a high-voltage (e.g., kilovolt) transmission line that is simultaneously used for AC or DC power transmission. Advantageously, each of the conductors of the pair of conductors may operate at the substantially same potential. For instance, the transmission line may include multiple conductors that can be held near ground potential, and multiple conductors that operate at high voltage (e.g., at least one kilovolt DC). The PLC may then take place on at least one pair of conductors held near ground potential. Alternatively, the PLC may take place on at least one pair of conductors operating at high voltage. As another example, the transmission line may include multiple conductors that are used for different AC phases. The PLC may then take place on at least one pair of conductors that have the same particular AC phase and operate at nominally equal, albeit changing, potential.

In one example system, the transmission line may be part of a tether that connects an aerial vehicle to a ground station. The aerial vehicle may generate DC power that is transmitted to the ground station on conductors of a transmission line. The conductors may be wrapped around a core of the tether and may carry a large amount of current (e.g., greater than 50 amperes) through the transmission line. In practice, the power transmission currents may be generated in conjunction with and controlled by high-speed switching circuitry. As a result, a large amount of conducted and radiated electrical noise may also be present on the conductors. Further, a PLC system may then generate small signal currents (e.g., less than one tenth of an ampere) that carry communication data and coexist on a pair of conductors of the transmission line with the larger power transmission current and electrical noise. For example, a PLC-transmitter coupled to a pair of conductors at a first position of the transmission line may transmit a communication signal on a pair of conductors operating at ground potential. And a PLC-receiver coupled to the pair of conductors at a second position of the transmission line may then receive the communication signal.

In some examples, data may be communicated over multiple pairs of conductors of a transmission line. For instance, if the transmission line includes four conductors operating near ground potential, data may be communicated over two different communication channels, each communication channel including a pair of conductors operating near ground potential.

In order to carry out PLC on a high-voltage DC power transmission line, the individual conductors used for communication may be isolated from one another by insulating the conductors. While the insulation may not ordinarily be necessary for transmission of power current, the insulation is added to provide separate signaling paths for the communication signals. The voltage insulation requirements between conductors operating at the same potential is, however, substantially reduced from the insulation requirements between high voltage conductors and ground potential conductors.

Further, in the described systems, the transmission line is designed so that power current carried in each conductor pair used for a PLC communication channel is evenly distributed such that each conductor in the pair carries nominally the same amount of power current. This may allow an efficient separation of the small, high-frequency signal currents used for communication from the large power currents at a point where communication signals need to be separated from the transmission line.

Moreover, differential-mode chokes may be used to separate the portion of the pair of conductors used for communication from power generation and conversion systems at either end of the transmission line. In particular, as described herein, the differential-mode chokes may effectively impede the flow of the low-level communication signal currents to the portions of the transmission line not used for communication, while allowing power transmission currents to pass through to the power generation and conversion systems at the ends of the transmission line.

Additional example systems and further aspects of the example systems are described below, with reference to the accompanying figures. Although portions of the figures are described with respect to a transmission line carrying power between an aerial vehicle and ground station, the example is not meant to be limiting. The PLC systems described herein may similarly be applicable to power transmission lines that are used in other types of applications.

II. ILLUSTRATIVE TETHERED FLIGHT SYSTEM

Referring now to the figures, FIG. 1 depicts a tethered flight system 100, according to an example embodiment. The tethered flight system 100 may include a ground station 110, a tether 120, and an aerial vehicle 130. As shown in FIG. 1, the aerial vehicle may be connected to the tether 120, and the tether 120 may be connected to the ground station 110. The tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 or the aerial vehicle 130.

The ground station 110 may be used to hold or support the aerial vehicle 130 until the aerial vehicle 130 is in a flight mode. The ground station 110 may also be configured to reposition the aerial vehicle 130 such that deploying the aerial vehicle is possible. Further, the ground station 110 may be further configured to receive the aerial vehicle 130 during a landing. The ground station 110 may be formed of any material that can suitably keep the aerial vehicle 130 attached or anchored to the ground while in hover flight, forward flight, or crosswind flight.

In addition, the ground station 110 may include one or more components (not shown), such as a winch, that may vary a length of the tether 120. For example, when the aerial vehicle 130 is deployed, the one or more components may be configured to pay out or reel out the tether 120. In some implementations, the one or more components may be configured to pay our or reel out the tether 120 to a predetermined length. As examples, the predetermined length could be equal to or less than a maximum length of the tether 120. Further, when the aerial vehicle 130 lands on the ground station 110, the one or more components may be configured to reel in the tether 120.

The tether may transmit electrical energy generated by the aerial vehicle 130 to the ground station 110. In addition, the tether 120 may transmit electricity to the aerial vehicle 130 to power the aerial vehicle for takeoff, landing, hover flight, or forward flight. The tether 120 may be constructed in any form and using any material which allows for the transmission, delivery, or harnessing of electrical energy generated by the aerial vehicle 130 or transmission of electricity to the aerial vehicle 130 when the aerial vehicle is in a flight mode. For example, the tether 120 may include a core configured to withstand one or more forces of the aerial vehicle 130 when the aerial vehicle is in hover flight, forward flight, or crosswind flight. The core of the fiber may be constructed of high strength fibers. In some examples, the tether 120 may have a fixed length or a variable length.

The aerial vehicle may include various types of devices, such as a kite, a helicopter, a wing, an airplane, or an aerostat, among other possibilities. The aerial vehicle may be formed of solid structures of metal, plastic, polymers, or any material which allows for a high thrust-to-weight ratio and generation of electrical energy which may be used in utility applications. Additionally, the materials may allow for a lightning hardened, redundant or fault tolerant design which may be capable of handling large or sudden shifts in wind speed and wind direction. Other materials may be possible as well.

As shown in FIG. 1, the aerial vehicle 130 may include a main wing 131, a front section 132, actuator connectors 133A-B, actuators 134A-D, a tail boom 135, a tail wing 136, and a vertical stabilizer 137. Any of these components may be shaped in any form which allows for the use of lift to resist gravity or move the aerial vehicle 130 forward.

The main wing 131 may provide a primary lift for the aerial vehicle 130 during forward flight, wherein the aerial vehicle 130 may move through air in a direction substantially parallel to a direction of thrust provided by the actuators 134A-D so that the main wing 131 provides a lift force substantially perpendicular to a ground. The main wing 131 may be one or more rigid or flexible airfoils, and may include various control surfaces or actuators, such as winglets, flaps, rudders, elevators, etc. The control surfaces may be used to steer or stabilize the aerial vehicle 130 or reduce drag on the aerial vehicle 130 during hover flight, forward flight, or crosswind flight. The main wing 131 may be any suitable material for the aerial vehicle 130 to engage in hover flight, forward flight, or crosswind flight. For example, the main wing 131 may include carbon fiber or e-glass. Moreover, the main wing 131 may have a variety of dimensions. For example, the main wing 131 may have one or more dimensions that correspond with a conventional wind turbine blade. The front section 131 may include one or more components, such as a nose, to reduce drag on the aerial vehicle 130 during flight.

The actuator connectors 133A-B may connect the actuators 134A-D to the main wing 131. In some examples, the actuator connectors 133A-B may take the form of or be similar in form to one or more pylons. In the example depicted in FIG. 1, the actuator connectors 133A-B are arranged such that the actuators 134A and 134B are located on opposite sides of the main wing 131 and actuators 134C and 134D are also located on opposite sides of the main wing 131. The actuator 134C may also be located on an end of the main wing 131 opposite of the actuator 134A, and the actuator 134D may be located on an end of main wing 131 opposite of the actuator 134B.

In a power generating mode, the actuators 134A-D may be configured to drive one or more generators for the purpose of generating electrical energy. As shown in FIG. 1, the actuators 134A-D may each include one or more blades. The actuator blades may rotate via interactions with the wind and could be used to drive the one or more generators. In addition, the actuators 134A-D may also be configured to provide a thrust to the aerial vehicle 130 during flight. As shown in FIG. 1, the actuators 134A-D may function as one or more propulsion units, such as a propeller. Although the actuators 134A-D are depicted as four actuators in FIG. 1, in other examples the aerial vehicle 130 may include any number of actuators.

In a forward flight mode, the actuators 134A-D may be configured to generate a forward thrust substantially parallel to the tail boom 135. Based on the position of the actuators 134A-D relative to the main wing 131 depicted in FIG. 1, the actuators may be configured to provide a maximum forward thrust for the aerial vehicle 130 when all of the actuators 134A-D are operating at full power. The actuators 134A-D may provide equal or about equal amounts of forward thrusts when the actuators 134A-D are operating at full power, and a net rotational force applied to the aerial vehicle by the actuators 134A-D may be zero.

The tail boom 135 may connect the main wing 131 to the tail wing 136 and the vertical stabilizer 137. The tail boom 135 may have a variety of dimensions. Moreover, in some implementations, the tail boom 135 could take the form of a body or fuselage of the aerial vehicle 130. In such implementations, the tail boom 135 may carry a payload.

The tail wing 136 or the vertical stabilizer 137 may be used to steer or stabilize the aerial vehicle 130 or reduce drag on the aerial vehicle 130 during hover flight, forward flight, or crosswind flight. For example, the tail wing 136 or the vertical stabilizer 137 may be used to maintain a pitch or a yaw attitude of the aerial vehicle 130 during hover flight, forward flight, or crosswind flight. In FIG. 1, the vertical stabilizer 137 is attached to the tail boom 135, and the tail wing 136 is located on top of the vertical stabilizer 137. The tail wing 136 may have a variety of dimensions.

While the aerial vehicle 130 has been described above, it should be understood that the methods and systems described herein could involve any aerial vehicle that is connected to a tether, such as the tether 120.

Figure 2:
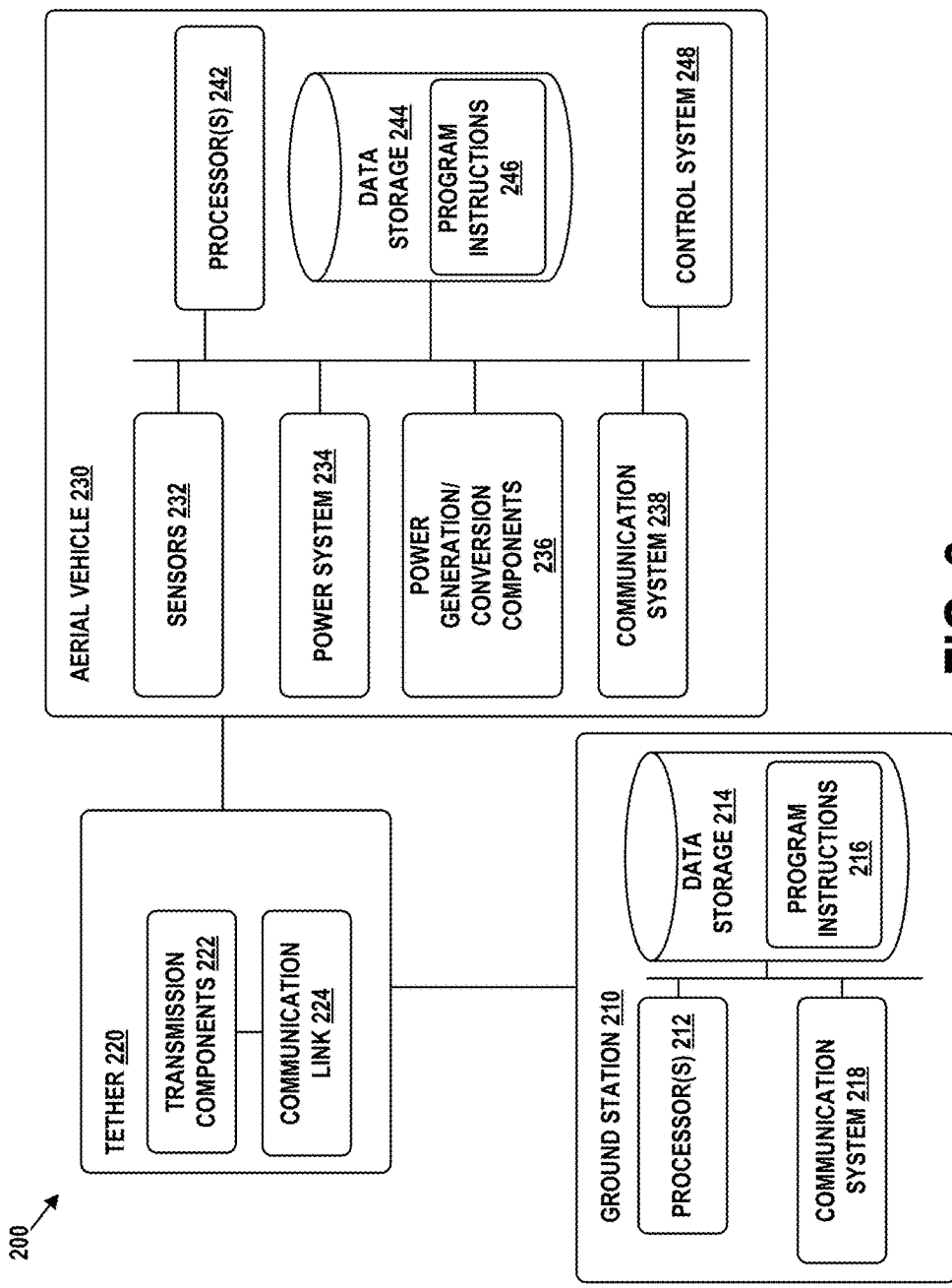
FIG. 2 is a simplified block diagram illustrating example components of the tethered flight system.

FIG. 2 is a simplified block diagram illustrating example components of a tethered flight system 200. The tethered flight system 200 may include a ground station 210, a tether 220, and an aerial vehicle 230. As shown in FIG. 2, the ground station 210 may include one or more processors 212, data storage 214, program instructions 216, and a communication system 218. A processor 212 may be a general-purpose processor or a special purpose processor (e.g., digital signal processors, application specific integrated circuits, etc.). The one or more processors 212 may be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the communications system 218 may include one or more wireless interfaces or one or more wireline interfaces, which allow the ground station 210 to communicate via one or more networks. Such wireless interfaces may provide for communication under one or more wireless communication protocols, such as Bluetooth, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. As described herein the communication system 218 may also include a PLC interface. The ground station 210 may communicate with the aerial vehicle 230, other ground stations, or other entities (e.g., a command center) via the communication system 218.

In an example embodiment, the ground station 210 may include communication systems 218 that allow for both short-range communication and long-range communication. For example, the ground station 210 may be configured for short-range communications using Bluetooth and for long-range communications under a CDMA protocol. In such an embodiment, the ground station 210 may be configured to function as a "hot spot", or as a gateway or proxy between a remote support device (e.g., the tether 220, the aerial vehicle 230, and other ground stations) and one or more data networks, such as a cellular network or the Internet. Configured as such, the ground station 210 may facilitate data communications that the remote support device would otherwise be unable to perform by itself.

For example, the ground station 210 may provide a Wi-Fi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 or transmit electrical energy from the ground station 210 to the aerial vehicle 230. The transmission components 222 may take various different forms in different embodiments. For example, the transmission components 222 may include one or more conductors that are configured to transmit electricity. And in at least one such example, the one or more conductors may include aluminum or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired or wireless interfaces. Also, there could be one or more routers, switches, or other devices or networks making up at least a part of the communication link 224. As described herein, the ground station 210 may alternatively or additionally communicate with the aerial vehicle 230 via PLC carried out over one or more conductors of the transmission components 222.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in different embodiments. For example, the sensors 232 may include a global positioning system (GPS) receiver. The GPS receiver may be configured to provide data that is typical of GPS systems (which may be referred to as a global navigation satellite system (GNSS)), such as the GPS coordinates of the aerial vehicle 230. Such GPS data may be utilized by the tethered flight system 200 to provide various functions.

As another example, the sensors 232 may include one or more wind sensors, such as one or more pitot tubes. The one or more wind sensors may be configured to detect apparent or relative wind. Such wind data may be utilized by the tethered flight system 200 to provide various functions described herein.

Still as another example, the sensors 232 may include an inertial measurement unit (IMU). The IMU may include both an accelerometer and a gyroscope, which may be used together to determine the orientation or attitude of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, errors in measurement may compound over time. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of or prevent drift of the IMU. The aerial vehicle 230 may include a thermometer or another sensor that senses air temperature as well.

As yet another example, the one or more sensors 232 may include one or more cameras configured to capture still or moving images.

As noted, the aerial vehicle 230 may include the power system 234. The power system 234 could take various different forms in different embodiments. For example, the power system 234 may include one or more batteries that provide power to the aerial vehicle 230. In some implementations, the one or more batteries may be rechargeable and each battery may be recharged via a wired connection between the battery and a power supply or via a wireless charging system, such as an inductive charging system that applies an external time-varying magnetic field to an internal battery or a charging system that uses energy collected from one or more solar panels.

As another example, the power system 234 may include one or more motors or engines for providing power to the aerial vehicle 230. In one embodiment, the power system 234 may provide power to the actuators 134A-D of the aerial vehicle 130, as shown and described in FIG. 1. In some implementations, the one or more motors or engines may be powered by a fuel, such as a hydrocarbon-based fuel. In such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in different embodiments. For example, the power generation/conversion components 236 may include one or more generators, such as high-speed, direct-drive generators. The one or more generators may be driven by one or more rotors or actuators, such as the actuators 134A-D as shown and described in FIG. 1.

Moreover, the aerial vehicle 230 may include a communication system 238. The communication system 238 may take the form of or be similar in form to the communication system 218 of the ground station 210. The aerial vehicle 230 may communicate with the ground station 210, other aerial vehicles, or other entities (e.g., a command center) via the communication system 238.

In some implementations, the aerial vehicle 230 may be configured to function as a "hot spot" or as a gateway or proxy between a remote support device (e.g., the ground station 210, the tether 220, other aerial vehicles) and one or more data networks, such as cellular network or the Internet. Configured as such, the aerial vehicle 230 may facilitate data communications that the remote support device would otherwise be unable to perform by itself.

For example, the aerial vehicle 230 may provide a Wi-Fi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems or with hardware, firmware, or software. As one example, the control system 248 may take the form of program instructions stored on a non-transitory computer readable medium and a processor that executes the instructions. The control system 248 may be implemented in whole or in part on the aerial vehicle 230 or at least one entity remotely located from the aerial vehicle 230, such as the ground station 210. Generally, the manner in which the control system 248 is implemented may vary, depending upon the particular embodiment.

III. ILLUSTRATIVE TETHER

Figure 3B:
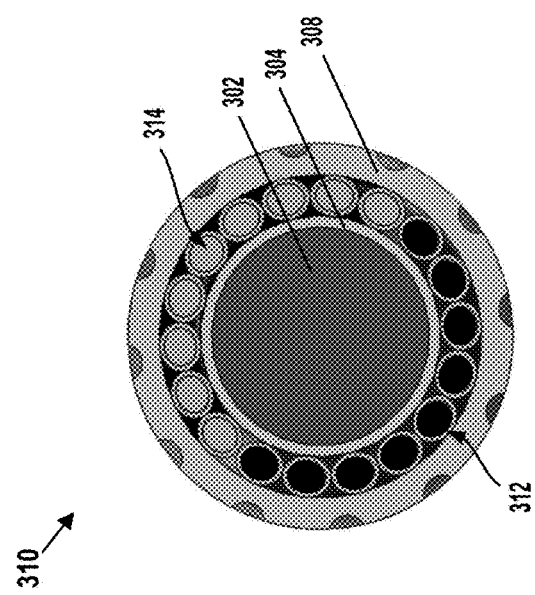
FIG. 3B illustrates a cross-sectional view of the portion of the tether of FIG. 3A, shown along line B of FIG. 3A.
Figure 3A:
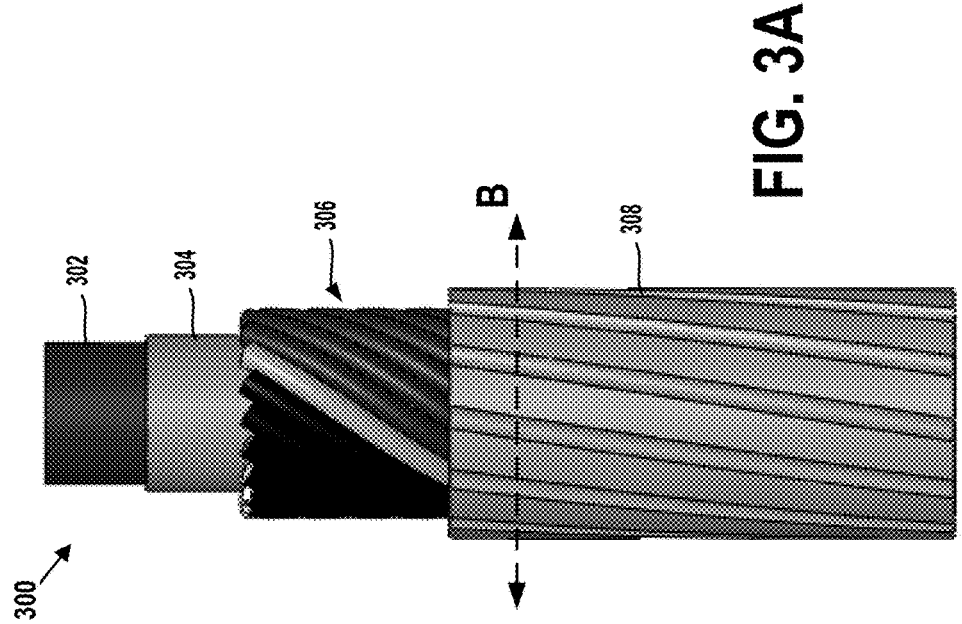
FIG. 3A illustrates a cutaway view of an example tether, in accordance with an embodiment.

FIG. 3A illustrates a cutaway view 300 of an example tether, in accordance with an embodiment. The example tether may include a load-bearing core 302, a compliant layer 304, multiple conductors 306, and an outer jacket 308.

In one embodiment, the load-bearing core 302 may be a pultruded carbon fiber strength member designed to withstand forces of an aerial vehicle to which the tether is coupled. Alternatively, the core may be constructed of several pultruded carbon fiber strength members (not shown), or another type of high tensile-strength material such as steel.

In turn, the core 302 is surrounded by a compliant layer 304, around which the conductors 306 are wound. The compliant layer 304 may be constructed of a low-modulus polymer, such as polyurethane, silicone rubber, or a cross-linked polymer. In some examples, the compliant layer 304 may also serve as an electrical insulator. Additionally, the compliant layer 304 may have a contoured cross-section such that its structural shape adds to its compliance.

The conductors 306 may be configured to transmit electricity. Accordingly, the conductors 306 may be aluminum, copper, or any other material which may allow for the conduction of electric current. In one example, the conductors may be configured for high-voltage AC or DC power transmission (e.g., greater than one thousand volts). For instance, the conductors may be configured to carry an AC or DC voltage of between 1 kilovolt and 5 kilovolts, or higher, and an associated power transmission current of between 50 amperes to 250 amperes. Other examples are also possible.

Further, in line with the discussion above, individual conductors of the conductors 306 may be insulated from one another. For example, each conductor may be surrounded by a rubber-like polymer, plastic, or other type of insulating material that forms a sheath around the conductor. Additionally, the conductors may feature a semiconducting layer between the metallic wire and the insulating material and/or a semiconducting layer on the outside of the insulating material.

The conductors 306 may be surrounded by an outer jacket 308. By way of example, the outer jacket may be constructed of a thermoplastic elastomer or a low density polyethylene.

Other configurations are also possible. For instance, the tether may include different numbers of conductors or additional or fewer layers. In one example, the tether may also include semiconducting layers, shielding, or both, in order to control the electric field stress, discharge leakage current, or channel current from a lightning strike.

FIG. 3B illustrates a cross-sectional view 310 of the portion of the tether of FIG. 3A, shown along line B of FIG.

3A. The load-bearing core 302, compliant layer 304, conductors 306, and outer jacket 308 described with reference to FIG. 3A are also depicted in FIG. 3B.

Further, as shown in FIG. 3B, the conductors 306 may be grouped into two groups operating at differing potentials. By way of example, a first group of conductors 312, surrounding a first half of the protective layer 304, may be configured to operate at high voltage, and a second group of conductors 314, surrounding a second half of the protective layer 304, can be held near ground potential. Other configurations are also possible. For instance, the first group of conductors may operate at +2000V relative to ground, and the second group of conductors may operate at −2000V relative to ground. As depicted, the tether of FIGS. 3A and 3B includes eighteen conductors, the first group of conductors 312 having nine conductors, and the second group of conductors 314 having nine different conductors.

As discussed above, data may be communicated over one or more pairs of conductors operating at the substantially same potential. In other words, data may be communicated over one or more pairs of conductors of the first group of conductors 312 and/or one or more pairs of conductors of the second group of conductors 314. In practice, as further described below with reference to FIGS. 4A, 4B, and 5, one or more PLC-transmitters and PLC-receivers may be coupled to the pair(s) of conductors at different positions along the tether in order to communicate data over the transmission line.

In addition to different numbers or sizes of wires, other conductor layouts are possible as well. FIG. 3C illustrates a cutaway view 320 of another example tether, in accordance with an embodiment. The example tether may include a load-bearing core 322, insulation or compliant layer 324, a first layer of conductors 326, an insulating layer 328, a second layer of conductors 330, and an outer jacket 332.

The load-bearing core 322 may be similar to the load-bearing core 302 of FIGS. 3A and 3B. Accordingly, the load-bearing core may be a pultruded carbon fiber strength member, or another type of high tensile-strength material, designed to withstand forces of an aerial vehicle to which the tether is coupled.

Further, the load-bearing core 322 may be surrounded by the insulation or compliant layer 324, around which the first layer of conductors 326 is wound. The insulation or compliant layer 324 may be constructed of a low-modulus polymer, such as polyurethane, silicone rubber, or a cross-linked polymer.

The first layer of conductors 326 may be configured to transmit electricity. Accordingly, the first layer of conductors 326 may include conductors made of aluminum, copper, or any other material which may allow for the conduction of electric current. The first layer of conductors 326 may be solid conductors, stranded conductors, or braided conductors. Furthermore, the first layer of conductors may be configured to carry a first phase of power (in an AC power transmission arrangement) or operate at a first potential (in a DC power transmission arrangement).

The first layer of conductors 326 may be surrounded by the insulating layer 328. In one example, the insulating layer 328 may be similar to the insulation or compliant layer 324. Accordingly, the insulating layer 328 may be constructed of a low-modulus polymer, such as polyurethane, silicone rubber, or a cross-linked polymer.

Additionally, the second layer of conductors 330 may be wound around the insulating layer 328. The second layer of conductors 330 may also be configured to transmit electricity. Thus, the second layer of conductors may include conductors made of aluminum, copper, or any other material which may allow for the conduction of electric current. And the second layer of conductors 330 may include solid conductors, stranded conductors, or braided conductors. Furthermore, the second layer of conductors may be configured to carry a second phase of power that is different from the first phase of power (in an AC power transmission arrangement) or operate at a second potential that is different from the first potential (in a DC power transmission arrangement).

Finally, the second layer of conductors 330 may be surrounded by an outer jacket 332. By way of example, the outer jacket 332 may be constructed of a thermoplastic elastomer or a low density polyethylene. The tether may also include semiconducting layers, shielding, or both, in order to control the electric field stress, discharge leakage current, or channel current from a lightning strike.

FIG. 3D illustrates a cross-sectional view 334 of the portion of the tether of FIG. 3C shown along line D of FIG. 3C. The load-bearing core 322, insulation or compliant layer 324, first layer of conductors 326, insulating layer 328, second layer of conductors 330, and outer jacket 332 described with reference to FIG. 3C are also depicted in FIG. 3C.

In this arrangement, data may be communicated over two or more groups of conductors within the first layer of conductors 326, or alternatively, data may be communicated over two or more groups of conductors within the second layer of conductors 330. For example, the first layer of conductors may be separated into two isolated paths.

In one example, in order to separate the first layer of conductors 326 into two isolated paths, a first conductor 336 and a second conductor 338 may each be replaced with an insulating rod, such as a polymer insulating rod that is about the same size as one of the conductors of the first layer of conductors 326. The insulating rod may function to isolate a first group of the conductors of the first layer of conductors 326 from a second group of conductors of the first layer of conductors 326. For instance, with reference to FIG. 3D, conductors of the first layer of conductors 326 that are located on the left side of the load-bearing core 322 may form a first isolated path, while conductors of the first layer of conductors 326 that are on the right side of the load-bearing core 322 may form a second isolated path. Other methods of creating isolated paths are also possible. Alternatively, more than two conductors of the first layer of conductors 326 may be replaced with an isolated rod to create additional isolated paths (not shown). Additionally or alternatively, two or more conductors of the second layer of conductors 330 may be replaced within insulating rods (also not shown).

With the arrangement shown in FIG. 3D, PLC may then be carried out by coupling a PLC-transmitter and a PLC-receiver to a pair of conductors of the first layer of conductors 326. For instance, the first conductor of the pair may be a conductor that is in a first isolated path of the first layer of conductors 326 and the second conductor of the pair may be a conductor that is in a second isolated path of the first layer of conductors 326.

IV. ILLUSTRATIVE POWER-LINE COMMUNICATION SYSTEMS

To help illustrate features of the present disclosure, portions of this document focus on a power-line communication system coupled to a DC power transmission line by way of example. Those of ordinary skill in the art will readily appreciate, however, that the disclosed principles can be applied as well to an AC power transmission line, with variations where appropriate. For instance, in an AC power transmission line, a first PLC modem and a second PLC modem may be coupled to a pair of conductors that have the same phase and which carry roughly an equal amount of current while operating at a nominally equal, albeit changing potential. Further, in line with the discussion above, each of the conductors of the pair of conductors may be isolated from one another by creating two isolated paths within a layer of conductors, for example.

Figure 4A:
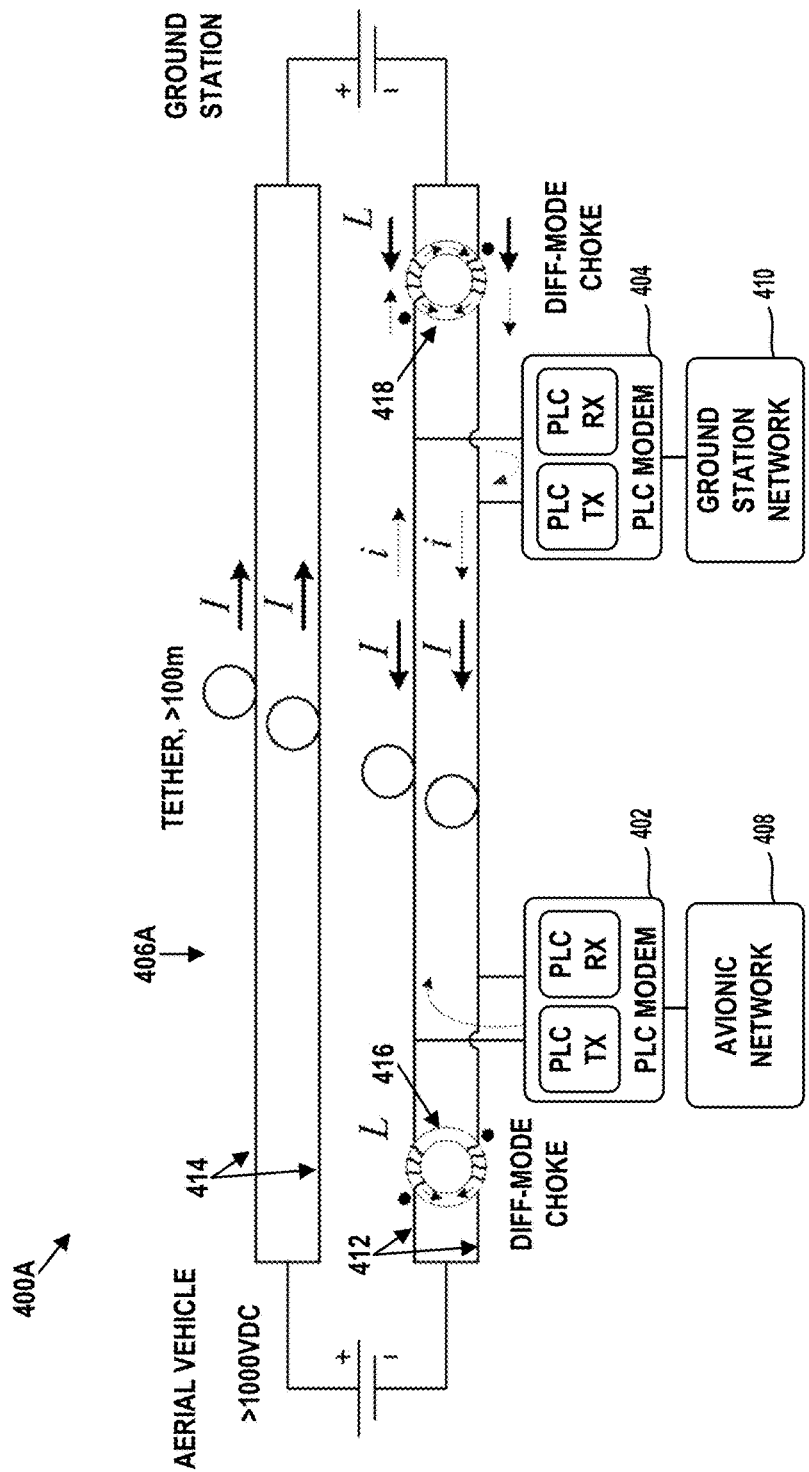
FIG. 4A illustrates an example PLC system, in accordance with an embodiment.

Referring now to FIG. 4A, FIG. 4A illustrates an example PLC system 400A, in accordance with an embodiment. As shown, the example PLC system 400A includes a first PLC modem 402 and a second PLC modem 404, each coupled to a transmission line 406A. Further, the first PLC modem 402 is shown coupled to an avionic network 408, while the second PLC modem 404 is shown coupled to a ground station network 410.

The first PLC modem 402 is coupled to the transmission line 406A at a first position that is near a first end of the transmission line 406A. In particular, the first PLC modem 402 is shown coupled to a first pair of conductors 412 of the transmission line. The second PLC modem 402 is also coupled to the first pair of conductors 412 at a second position that is near a second end of the transmission line 406A. In one example, the first PLC modem 402 may be located on an aerial vehicle, while the second PLC modem 404 may be located on a ground station.

Each of the first PLC modem 402 and the second PLC modem 402 may include a PLC-transmitter and a PLC-receiver, as well as additional components and circuitry for performing PLC. For instance, the first PLC modem 402 and the second PLC modem 402 may include one or more interfaces for communicating with the avionic network 408 and the ground station network 410. Further, the first PLC modem 402 and the second PLC modem 404 may include one or more processors configured to carry out instructions that when executed by the one or more processors, cause the first PLC modem 402 and the second PLC modem 404 to send and/or receive data over the first pair of conductors 412, in accordance with one or more modulation protocols. Example modulation protocols include OFDM and QAM, for instance, among other possibilities. As further described below, the first PLC modem 402 and the second PLC modem 404 may also include PLC circuitry interfaces for interfacing with the first pair of conductors 412.

In one instance, conductors of the first pair of conductors 412 may operate at the substantially same potential. For example, as shown, the conductors of the first pair of conductors 412 may each operate at (or near) ground potential. Meanwhile, a second pair of conductors 414 of the transmission line may operate at greater than one thousand volts DC. In other examples, the transmission line 406A may include more conductors, such as additional conductors operating at the high voltage and/or additional conductors operating near ground potential, or additional conductors operating at several kilovolts below ground potential.

As further illustrated in FIG. 4A, the power transmission current "/" flows in a common direction within the pair of conductors 412 and flows in an opposite direction within the pair of conductors 414. In particular, the power transmission current flows from the aerial vehicle to the ground station in the pair of conductors 414, and the power transmission current flows from the ground station to the aerial vehicle in the pair of conductors 412. In practice, the total amount of power transmission current in the pair of conductors 414 may be equal to the total amount of power transmission current in the pair of conductors 412. As an example, the power transmission current in each conductor of the transmission line 406A may be in the range of 50 amperes to 250 amperes.

Additionally, in some embodiments, the conductors of the transmission line 406A may include conducted and radiated electrical noise (not shown). The conducted and radiated electrical noise may result from high-speed switching circuitry used to generate the power transmission currents, for example.

As also depicted in FIG. 4A, the first PLC modem 402 and/or the second PLC modem 404 may generate a PLC-signal current "i" that is smaller than the power transmission current. In practice, the PLC-signal current may be less than one tenth of an ampere, for example. In contrast to the power transmission current, the conductors of the pair of conductors 412 may be driven differentially with the PLC-signal current, whereas the power transmission current flows in a common direction (i.e., towards the aerial vehicle).

For instance, a PLC-transmitter of the first PLC modem 402 may provide a communication signal that generates a PLC-signal current traveling towards the ground station in a first conductor of the pair of conductors 412 and subsequently returning towards the aerial vehicle on a second conductor of the pair of conductors 412. Note that depending on the logic level to be sent, the PLC-transmitter may inject a small current into one conductor or the other, thus, the example current directions of the PLC-signal current are not meant to be limiting. In either case, the generated PLC-signal current may pass through a resistor of the PLC-receiver of the second PLC modem 404, creating a small voltage difference across the receiver. The PLC-receiver may then sense the polarity of the voltage difference to determine the logic level.

The PLC system 400A also includes a first differential-mode choke 416 and a second-differential-mode choke 418. In line with the discussion above, the differential-mode chokes may be used to separate a portion of the pair of conductors 412 used for communication from power generation and conversion systems at either end of the transmission line 406A. Specifically, the first differential-mode choke 416 may impede the flow of PLC-signal currents to systems of the aerial vehicle at one end of the transmission line 406A, and the second differential-mode choke 418 may impede the flow of PLC-signal currents to systems of the ground station at the opposite end of the transmission line 406A.

In one embodiment, the differential-mode chokes may be in the form of magnetic cores around which the conductors of the pair of conductors 412 are coiled. As such, current traveling in the conductors may induce a magnetic flux in the core. As discussed above, the conductors may be driven differentially with the communication signal, such that the PLC-signal current "i" flows in opposite directions in the conductors of the pair of conductors 412, while the power transmission current "/" flows in a common direction in the conductors of the pair of conductors 412. The conductors of the pair of conductors 412 may be wrapped around each core of the differential-mode chokes in such a manner that, due to the directions of current flow, the flux induced by the power transmission currents cancels out, but the flux induced by the PLC-signal currents adds.

The flux induced by the PLC-signal currents may thus create an inductance for the PLC-signal currents that impedes the flow of current through the differential-mode chokes. As such, the differential-mode chokes may effectively impede the flow of the low-level communication signal currents to the portions of the transmission line 406A not used for communication, and may be used to isolate the communication signal from systems at either end of the transmission line 406A. Meanwhile, the power transmission currents may continue to pass through the differential-mode chokes to the systems at the ends of the transmission line 406A, since the flux induced by the power transmission currents does not create an inductance that impedes the flow of the power transmission currents.

Furthermore, any high-frequency differential-mode noise originated by power generation or conversion circuitry may also be impeded by the inductance of the differential-mode chokes. And since the magnetic flux induced by the comparatively large power transmission currents cancels out, the cores of the differential-mode chokes can be sized to accommodate only the flux levels required to accommodate power transmission current mismatches and PLC-signal currents. Consequently, small, light-weight inductors may be used to implement the differential-mode chokes.

The avionic network 408 and the ground station network may each include one or more computing devices that are communicatively linked via wired or wireless communication interfaces. Consequently, depending on the desired configuration, the first PLC modem 402 may send/receive a variety of types of data to/from the avionic network 408, and the second PLC modem 404 may send/receive a variety of types of data to/from the ground station network 410. In one embodiment, sensor data from various sensors on the aerial vehicle, such as any of the sensors 232 of FIG. 2, for example, may be communicated to the ground station. For instance, video data captured by a camera of the aerial vehicle may be provided by a computing device in the avionic network 408 to a computing device in the ground station network 410 by sending communication signals over the pair of conductors 412. In another embodiment, command and control data for the aerial vehicle may be communicated from the ground station to the aerial vehicle over the pair of conductors 412, and the aerial vehicle may also communicate operational data back to the ground station over the pair of conductors 412. For instance, the aerial vehicle may be an airborne wind turbine configured to generate power, and the command and control data may relate to control and operation of the airborne wind turbine in order to generate power.

In practice, using the example PLC system 400A, the first PLC modem 402 and the second PLC modem 404 may communicate data to one another at data rates greater than one megabit per second when operating at full power. For instance, data may be sent between the first PLC modem 402 and the second PLC modem 404 at tens of megabits per second when using a modulation scheme such as OFDM that occupies frequencies in the 2 MHz to 80 MHz range. The PLC communication data rate may be even greater if communication signals are sent over multiple pairs of conductors of the transmission line 406A, rather than only a single pair of conductors.

Figure 4B:
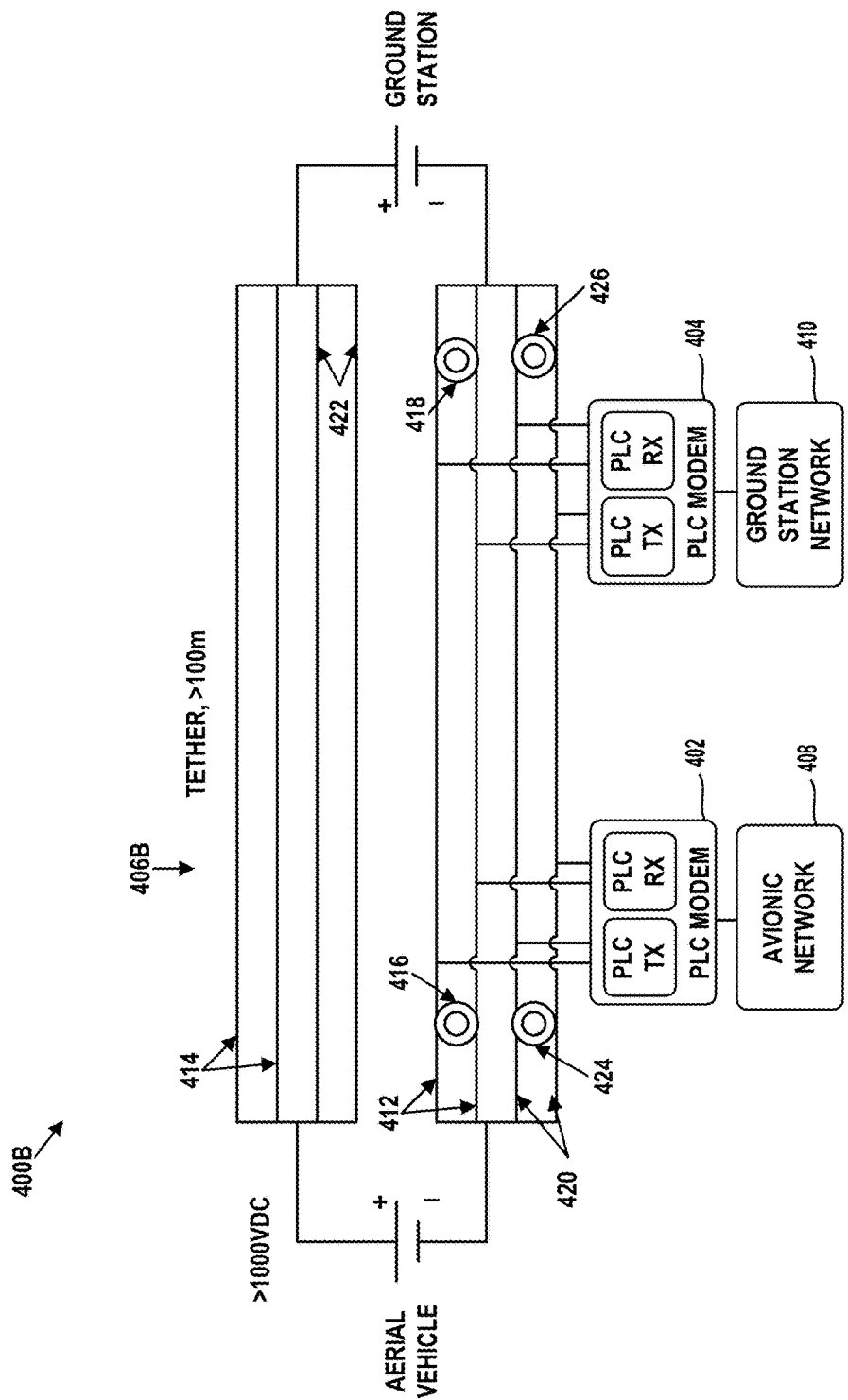
FIG. 4B illustrates another example PLC system, in accordance with an embodiment.

FIG. 4B illustrates another example PLC system 400B, in accordance with an embodiment. As shown in FIG. 4B, the PLC system 400B includes the first PLC modem 402, the second PLC modem 404, the avionic network 408, the ground station network 410, the first pair of conductors 412, the second pair of conductors 414, the first differential-mode choke 416, and the second differential-mode choke 418, which were each described with reference to the example PLC system 400A of FIG. 4A.

The example PLC system 400B includes a transmission line 406B that is different from the transmission line of 406A of FIG. 4A. Specifically, the transmission line 406B is illustrated as having more conductors than the transmission line 406A. The transmission line 406B includes another pair of conductors 420 operating near ground potential, and another pair of conductors 422 operating at high voltage (i.e., greater than one thousand volts DC). In other examples, the transmission line 406B may include more conductors, such as additional conductors operating at the high voltage and/or additional conductors operating near ground potential.

Additionally, the example PLC system 400B includes a third differential-mode choke 424 and a fourth differential-mode choke 426 that may be used to separate a portion of the pair of conductors 420 used for communication from power generation and conversion systems at either end of the transmission line 406B, in a manner similar to the use of the first differential-mode choke 416 and the second differential-mode choke 418 described with respect to the example PLC system of FIG. 4A.

As depicted in FIG. 4B, the first PLC modem 402 is also coupled to both the pair of conductors 412 and the pair of conductors 420 at a first position of the transmission line 406B and the second PLC modem 404 is coupled to both the pair of conductors 412 and the pair of conductors 420 at a second position of the transmission line 406B. Accordingly, the first PLC modem 402 and the second PLC modem 404 may communicate over a first communication channel on the pair of conductors 412 and simultaneously communicate over a second communication channel on the pair of conductors 420. For example, a PLC-transmitter of the first PLC modem 402 may send a first PLC-signal over the pair of conductors 412 and send a second PLC-signal over the pair of conductors 420. A PLC-receiver of the PLC modem 404 may then receive both the first PLC-signal and the second PLC-signal.

Therefore, in the example PLC system 400B, data may be communicated between the avionic network 408 and the ground network 410 over multiple communication channels using PLC technology. In one instance, data may be communicated at approximately 50 to 80 megabits per second over a transmission line of about 400 hundred to 500 meters using the example PLC system 400B.

Figure 5:
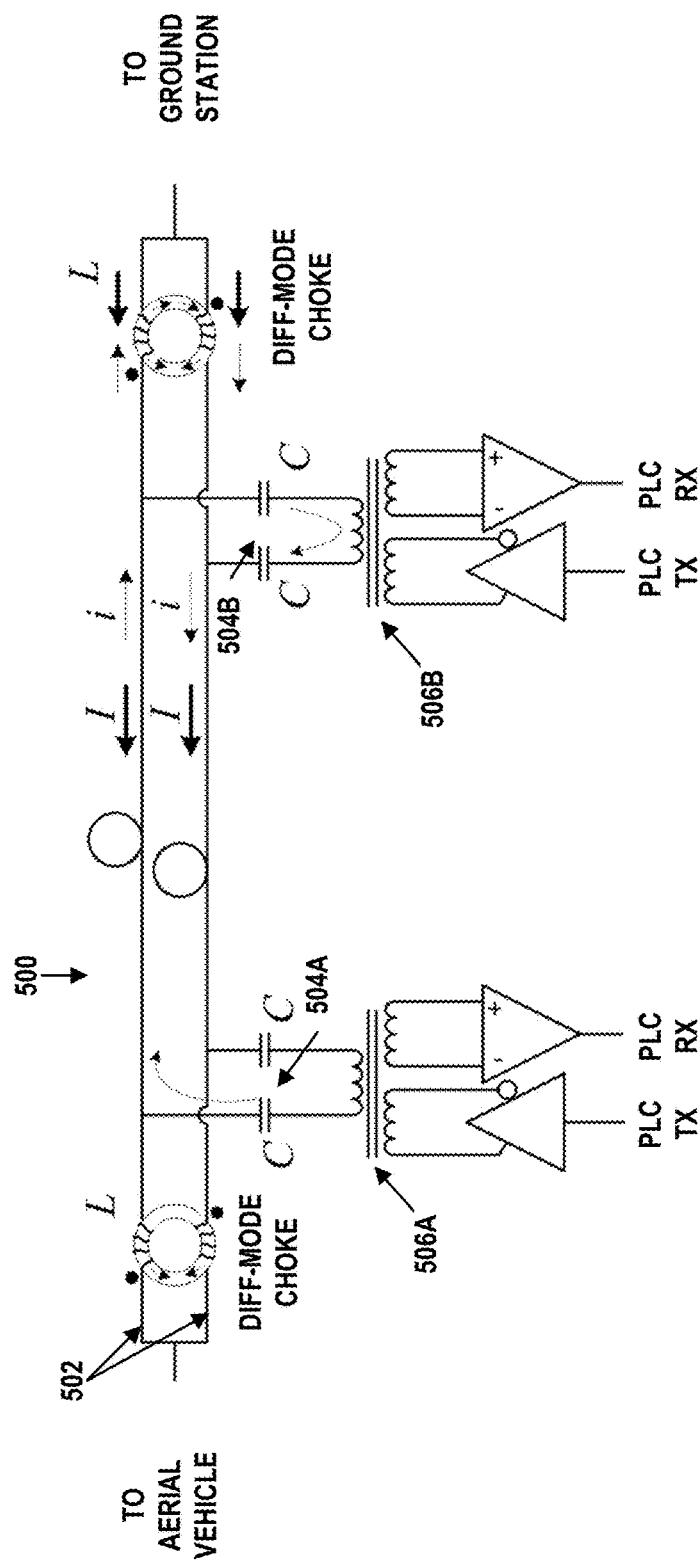
FIG. 5 illustrates example PLC circuitry for interfacing with conductors of a transmission line, in accordance with an embodiment.

Referring now to FIG. 5, FIG. 5 illustrates example PLC circuitry for interfacing with conductors of a transmission line 500, in accordance with an embodiment.

In particular FIG. 5 shows a schematic illustrating two possible ways in which a PLC-transmitter and PLC-receiver may couple a communication signal to a pair of conductors 502 operating at the substantially same potential. For purposes of explanation, both possible ways are depicted in FIG. 5, however, in practice, the PLC-transmitters and PLC-receivers may couple a communication signal to the transmission line 500 using only one of the mechanisms.

In one embodiment, the PLC-transmitters and PLC-receivers may couple a communication signal to the pair of conductors 502 using the capacitors 504A and 504B. Depending on the desired configuration, the capacitance values of the capacitors 504A and 504B may be appropriately selected such that only signals in the bandwidth of the communication scheme are coupled to the transmission line 500, while lower frequency interference, generated by power generation and conversion electronics, for instance, is not coupled to the transmission line 500.

In another embodiment, the PLC-transmitters and PLC-receivers may couple a communication signal to the pair of conductors 502 using the transformers 506A and 506B. Depending on the desired configuration, the transformers 506A and 506B may also be carefully selected such that that only signals in the bandwidth of the communication scheme are coupled to the transmission line 500, while lower frequency interference, generated by power generation and conversion electronics, for instance, is not coupled to the transmission line 500.

Other types of circuitry for coupling a communication signal to the transmission line may also be used. Accordingly, the examples described in FIG. 5 are not meant to be limiting.

IV. CONCLUSION

The particular arrangements shown in the figures should not be viewed as limiting. It should be understood that other embodiments may include more or less of each element shown in a given figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A power-line communication (PLC) system comprising:
   a PLC-transmitter on an aerial vehicle, the PLC-transmitter coupled to a pair of conductors of a transmission line and configured to transmit a communication signal on the pair of conductors, wherein the pair of conductors are wrapped around a load-bearing core of a tether in a layer of conductors, wherein the tether connects the aerial vehicle to a ground station, wherein the transmission line carries a voltage greater than one thousand volts over a distance of at least one hundred meters between the aerial vehicle and the ground station, and wherein conductors of the pair of conductors operate at the substantially same potential; and
   a PLC-receiver coupled to the pair of conductors at the ground station and configured to receive the communication signal,
   wherein the layer of conductors comprises a first group of conductors isolated from a second group of conductors by an insulating rod in the layer of conductors, and wherein a first conductor of the pair of conductors is in the first group of conductors and a second conductor of the pair of conductors is in the second group of conductors such that the first conductor and the second conductor are isolated from one another within the layer of conductors.

2. The PLC system of claim 1, wherein a bandwidth of the PLC system averages at least one megabit per second when operating at full power.

3. The PLC system of claim 1, wherein the communication signal comprises a differential communication signal.

4. The PLC system of claim 3, further comprising a first differential-mode choke and a second differential-mode choke coupled to the pair of conductors, wherein the first differential-mode choke and the second differential-mode choke separate a portion of the transmission line used for PLC from portions of the transmission line not used for PLC.

5. The PLC system of claim 4, wherein the first differential-mode choke and the second differential-mode choke each comprise a respective magnetic core around which the conductors of the pair of conductors are coiled.

6. The PLC system of claim 1, wherein the conductors of the pair of conductors are independently isolated from each other.

7. The PLC system of claim 1, further comprising:
   another PLC-transmitter on the ground station coupled to the pair of conductors and configured to transmit another communication signal on the pair of conductors in the opposite direction; and
   another PLC-receiver on the aerial vehicle coupled to the pair of conductors and configured to receive the other communication signal.

8. The PLC system of claim 1, wherein the conductors of the pair of conductors operate at ground potential.

9. The PLC system of claim 8, wherein the transmission line further comprises a second pair of conductors operating at greater than one thousand volts.

10. The PLC system of claim 8:
    wherein the transmission line further comprises another pair of conductors that operate at ground potential,
    wherein the PLC-transmitter is coupled to the other pair of conductors and configured to transmit another communication signal on the other pair of conductors, and
    wherein the PLC-receiver is coupled to the other pair of conductors and configured to receive the other communication signal.

11. The PLC system of claim 1:
    wherein the conductors of the pair of conductors each carry a current that is greater than 50 amperes and flows in a common direction; and
    wherein the PLC-transmitter is configured to generate a PLC-signal current that is less than a tenth of an ampere.

12. The PLC system of claim 1, wherein the aerial vehicle comprises an unmanned aerial vehicle.

13. The PLC system of claim 1, wherein the aerial vehicle comprises an airborne wind turbine.

14. The PLC system of claim 1, wherein the voltage comprise a direct current (DC) voltage.

15. The PLC system of claim 1, wherein the voltage comprises an alternating current (AC) voltage, and wherein the conductors of the pair of conductors have a same phase.

16. A power-line communication (PLC) system, comprising:
    a PLC-transmitter coupled to a pair of conductors of a transmission line at a first position of the transmission line and configured to transmit a communication signal on the pair of conductors, wherein the PLC-transmitter is configured to generate a PLC-signal current that flows in a first direction within a first conductor of the pair of conductors and flows in an opposite direction within a second conductor of the pair of conductors, wherein the first conductor and the second conductor of the pair of conductors operate at the substantially same potential, and wherein power transmission currents flow in a common direction within the first conductor and the second conductor;

a PLC-receiver coupled to the pair of conductors at a second position of the transmission line and configured to receive the communication signal; and a first differential-mode choke and a second differential-mode choke coupled to the pair of conductors, wherein the first differential-mode choke and the second differential-mode choke separate a portion of the transmission line used for PLC from portions of the transmission line not used for PLC, wherein the first differential-mode choke impedes a flow of PLC-signal currents to systems of an aerial vehicle, wherein the second differential-mode choke impedes the flow of PLC-signal currents to systems of a ground station, and wherein the first differential-mode choke and the second differential-mode choke allow the power transmission currents to pass through.

17. The PLC system of claim 16, wherein the transmission line comprises a tether coupling the aerial vehicle to the ground station.

18. The PLC system of claim 16, wherein the transmission line carries a direct current (DC) voltage greater than one thousand volts.

19. The PLC system of claim 16, wherein the transmission line carries an alternating current (AC) voltage greater than one thousand volts, and wherein the first conductor and the second conductor of the pair of conductors have a same phase.

* * * * *